US007229024B2

(12) United States Patent
Le Sesne

(10) Patent No.: US 7,229,024 B2
(45) Date of Patent: Jun. 12, 2007

(54) COLLIMATING SIGNALS

(75) Inventor: Richard H. Le Sesne, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 11/014,511

(22) Filed: Dec. 16, 2004

(65) Prior Publication Data

US 2006/0131422 A1 Jun. 22, 2006

(51) Int. Cl.
*G06K 19/06* (2006.01)

(52) U.S. Cl. ...................... 235/492; 235/486; 343/702; 343/765

(58) Field of Classification Search ................ 235/492, 235/486, 451; 343/702, 872, 765; 174/50, 174/353; 455/269
See application file for complete search history.

(56) References Cited

U.S. PATENT DOCUMENTS 3,546,704 A * 12/1970 Selby et al. ................ 343/765
5,719,586 A 2/1998 Tuttle
6,025,811 A 2/2000 Canora et al.
6,121,544 A * 9/2000 Petsinger .................... 174/353
6,271,793 B1 8/2001 Brady et al.
6,278,413 B1 8/2001 Hugh et al.
2001/0030628 A1 10/2001 Brady et al.
2003/0080917 A1 5/2003 Adams et al.

FOREIGN PATENT DOCUMENTS

JP 2003085515 3/2003

* cited by examiner

*Primary Examiner*—Daniel A. Hess
(74) *Attorney, Agent, or Firm*—Schmeiser, Olsen & Watts; John R. Pivnichny

(57) ABSTRACT

A electrical structure and associated method for collimating a wireless signal between a RFID transceiver and a RFID tag. The electrical structure comprises a RFID tag and an enclosure structure. The enclosure structure comprises a radio frequency opaque material. The RFID tag is located within the enclosure structure. The enclosure structure is adapted to collimate, a first radio frequency signal from the RFID transceiver to the RFID tag.

12 Claims, 6 Drawing Sheets

COLLIMATING SIGNALS

BACKGROUND OF THE INVENTION

1. Technical Field

The present invention relates to an apparatus and associated method to collimate at least one wireless signal between a transceiver and a receiver.

2. Related Art

Providing a directional signal between electrical devices is typically difficult and costly. Therefore there is a need to efficiently and inexpensively provide a directional signal between electrical devices.

SUMMARY OF THE INVENTION

The present invention provides an electrical structure comprising:

a RFID tag; and an enclosure structure comprising a radio frequency opaque material, wherein the RFID tag is located within the enclosure structure, and wherein the enclosure structure is adapted to collimate, a first radio frequency signal from a first RFID transceiver to the RFID tag.

The present invention provides an electrical structure comprising:

a first RFID transceiver; and an enclosure structure comprising a radio frequency opaque material, wherein the RFID transceiver is located within the enclosure structure, and wherein the enclosure structure is adapted to collimate, a first radio frequency signal from the first RFID transceiver to a first RFID tag.

The present invention provides a system comprising:

a RFID tag;

a first RFID transceiver within a first enclosure structure, wherein the first enclosure structure comprises a first radio frequency opaque material; and a second RFID transceiver within a second enclosure structure, wherein the second enclosure structure comprises a second radio frequency opaque material, wherein the first enclosure structure is adapted to collimate a first radio frequency signal comprising a first frequency from the first RFID transceiver to the RFID tag, and wherein the second enclosure structure is adapted to collimate a second radio frequency signal comprising a second frequency from the RFID tag to the second RFID transceiver in response to the first radio frequency signal.

The present invention provides a method comprising:

providing a first RFID tag, a first RFID transceiver, and an enclosure structure, wherein the enclosure structure comprises a radio frequency opaque material;

placing the first RFID tag or the first RFID transceiver in the enclosure structure; and collimating by the enclosure structure, a first radio frequency signal between the first RFID tag and the first RFID transceiver.

DETAILED DESCRIPTION OF THE INVENTION

Figure 1A:
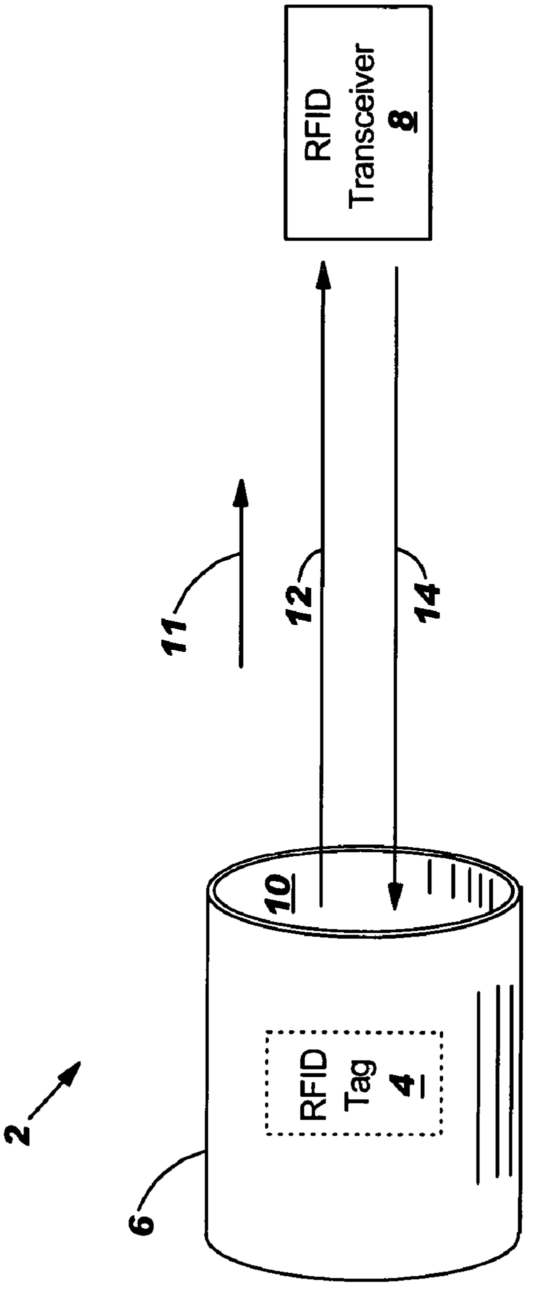
FIG. 1A illustrates a block diagram of a system for collimating signals between a radio frequency identification tag (RFID) and a RFID transceiver, in accordance with embodiments of the present invention.
Figure 1B:
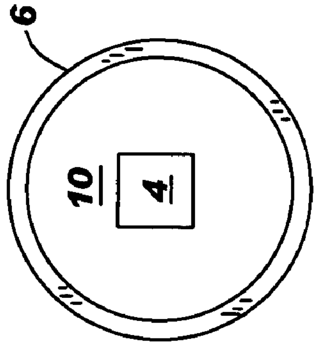
FIG. 1B illustrates a top view of the enclosure structure of FIG. 1, in accordance with embodiments of the present invention.

FIG. 1A illustrates a block diagram of a system 2 for collimating a signal 12 and a signal 14 between a radio frequency identification tag 4 (RFID tag 4) and a RFID transceiver 8, in accordance with embodiments of the present invention. A RFID tag (e.g., RFID tag 4) is a wireless device for receiving and responding (e.g., responding with an ID code) to RF queries. The queries are transmitted from a RFID transceiver (e.g., RFID transceiver 8). The system 2 comprising the RFID tag 4 and the RFID transceiver 8 may be used to identify and/or track items by placing the RFID tag 4 in the item and using the RFID transceiver 8 to query the RFID tag 4. The RFID 4 tag in response transmits data to the RFID transceiver 8. For example, the system 2 may be used for, inter alia, product price scanning, airline baggage tracking, electronic toll collection, spacial measurements, spacial measurements with time differential, etc. The RFID transceiver 8 transmits a signal 14 to the RFID tag 4 and in response the RFID tag 4 transmits a signal 12 (e.g., comprising data) back to the RFID transceiver 8. The signal 12 and the signal 14 may each comprise a different frequency. Each of the signals 12 and 14 may independently comprise any frequency or frequency range including, inter alia, 124–134 kilohertz, 13.56 megahertz, 868–956 megahertz, 2.45 gigahertz, etc. The RFID tag in FIG. 1 is placed in an enclosure structure 6 comprising a radio frequency opaque material and an opening 10 (see FIG. 1B for top view of enclosure structure 6). The enclosure structure 6 comprises a radio frequency opaque material that is opaque to a plurality of frequencies including a frequency of the signal 12 and a frequency of the signal 14 so that the signal 12 and the signal 14 are directed through the opening 10 thereby collimating the signal 12 and the signal 14 between the RFID tag 4 and the RFID transceiver 8. The enclosure structure 6 ensures that signal 12 and the signal 14 are directed between the RFID tag 4 and the RFID transceiver 8. The collimation property of the enclosure structure 6 prevents the signal 12 from the RFID tag 4 from interfering with any external signals that may be in an area surrounding the enclosure structure 6 as the signal 12 is directed through the opening 10 by the radio frequency opaque material of the enclosure structure 6. Additionally, the enclosure structure 6 blocks any external signals (e.g., a signal from another RFID transceiver) from transmitting to the RFID tag 4 except through the opening 10. The opening 10 forces the signals 12 and 14 in a direction 11 and opposite to the direction 11, respectively. The radio frequency opaque material may comprise any radio frequency opaque material including, inter alia, metal (solid or stranded), plastic, liquid, gas, etc. The enclosure structure 6 in FIG. 1 is cylindrical in shape but may alternatively comprise any shape including, inter alia, cubical, triangular, rectangular, polygon, spherical, etc.

FIG. 1B illustrates a top view of the enclosure structure 6 of FIG. 1, in accordance with embodiments of the present invention. Additionally, FIG. 1B illustrates a top view of the RFID tag 14 of FIG. 1.

Figure 2:
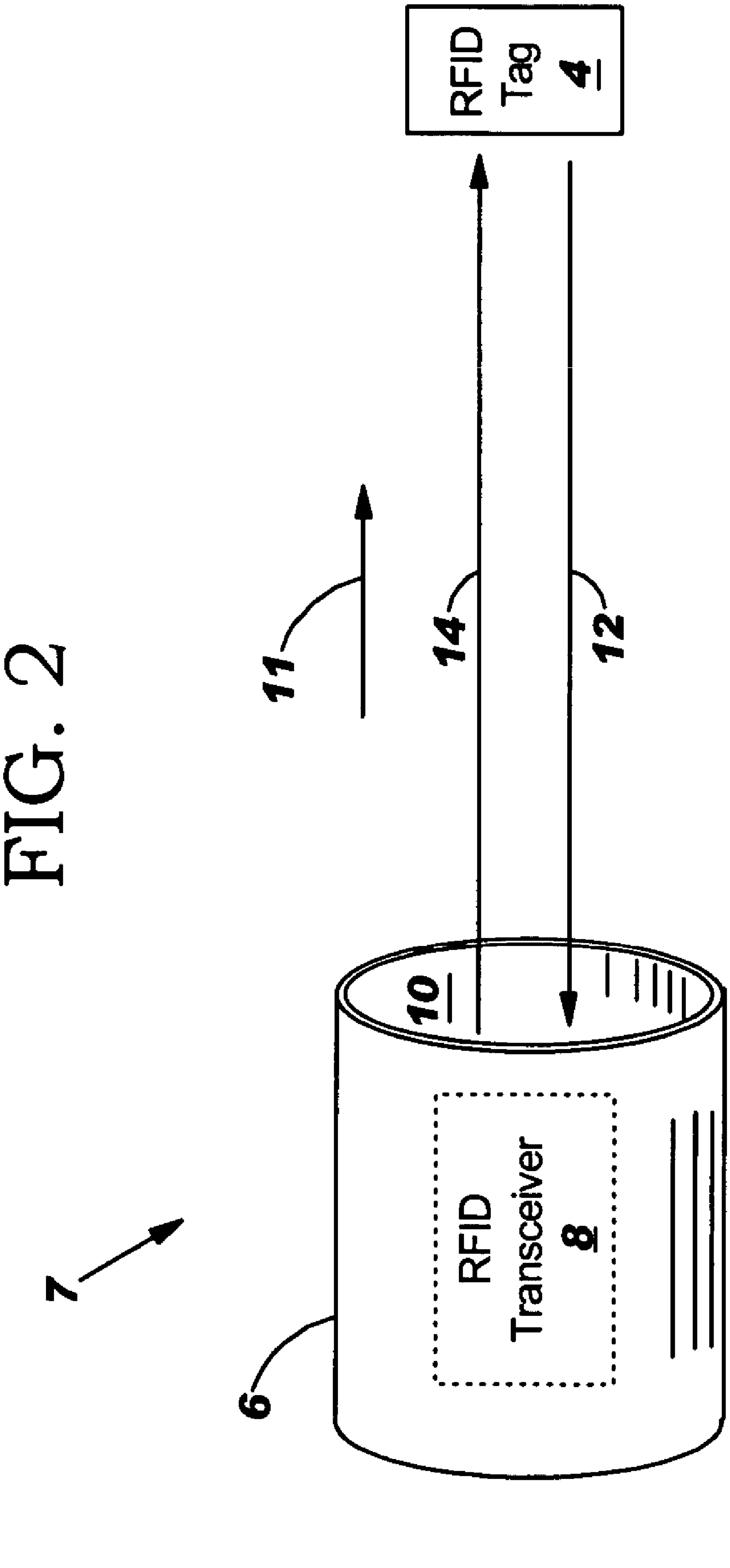
FIG. 2 illustrates a first alternative to FIG. 1, in accordance with embodiments of the present invention.

FIG. 2 illustrates a first alternative to FIG. 1A showing a block diagram of a system 7 for collimating a signal 12 and a signal 14 between an RFID tag 4 and a RFID transceiver 8, in accordance with embodiments of the present invention. The system 7 comprising the RFID tag 4 and the RFID transceiver 8 may be used to identify and/or track items by placing the RFID tag 4 in the item and using the RFID transceiver 8 to query the RFID tag 4. In response, the RFID tag 4 transmits data to the RFID transceiver 8. For example, the system 7 may be used for, inter alia, product price scanning, airline baggage tracking, electronic toll collection, spacial measurements, spacial measurements with time differential, etc. In contrast to FIG. 1, the RFID transceiver 8 in FIG. 2 is placed in the enclosure structure 6 comprising a radio frequency opaque material and an opening 10. The enclosure structure 6 comprises a radio frequency opaque material that is opaque to a plurality of frequencies including a frequency of the signal 12 and a frequency of the signal 14 so that the signal 12 and the signal 14 are directed through the opening 10 thereby collimating the signal 12 and the signal 14 between the RFID tag 4 and the RFID transceiver 8. The collimation property of the enclosure structure 6 ensures that signal 12 and the signal 14 are directed between the RFID tag 4 and the RFID transceiver 8. The enclosure structure 6 prevents the signal 14 from the RFID transceiver 8 from interfering with any external signals that may be in an area surrounding the enclosure structure 6 as the signal 14 is directed through the opening 10 by the radio frequency opaque material of the enclosure structure 6. Additionally, the enclosure structure 6 blocks any external signals (e.g., a signal from another RFID tag) from transmitting to the RFID transceiver 8 except through the opening 10. The opening 10 forces the signals 12 and 14 in a direction 11 and opposite to the direction 11, respectively. The radio frequency opaque material may comprise any radio frequency opaque material including, inter alia, metal (solid or stranded), plastic, liquid, gas, etc. The enclosure structure 6 in FIG. 2 is cylindrical in shape but may alternatively comprise any shape including, inter alia, cubical, triangular, rectangular, polygon, spherical, etc.

Figure 3:
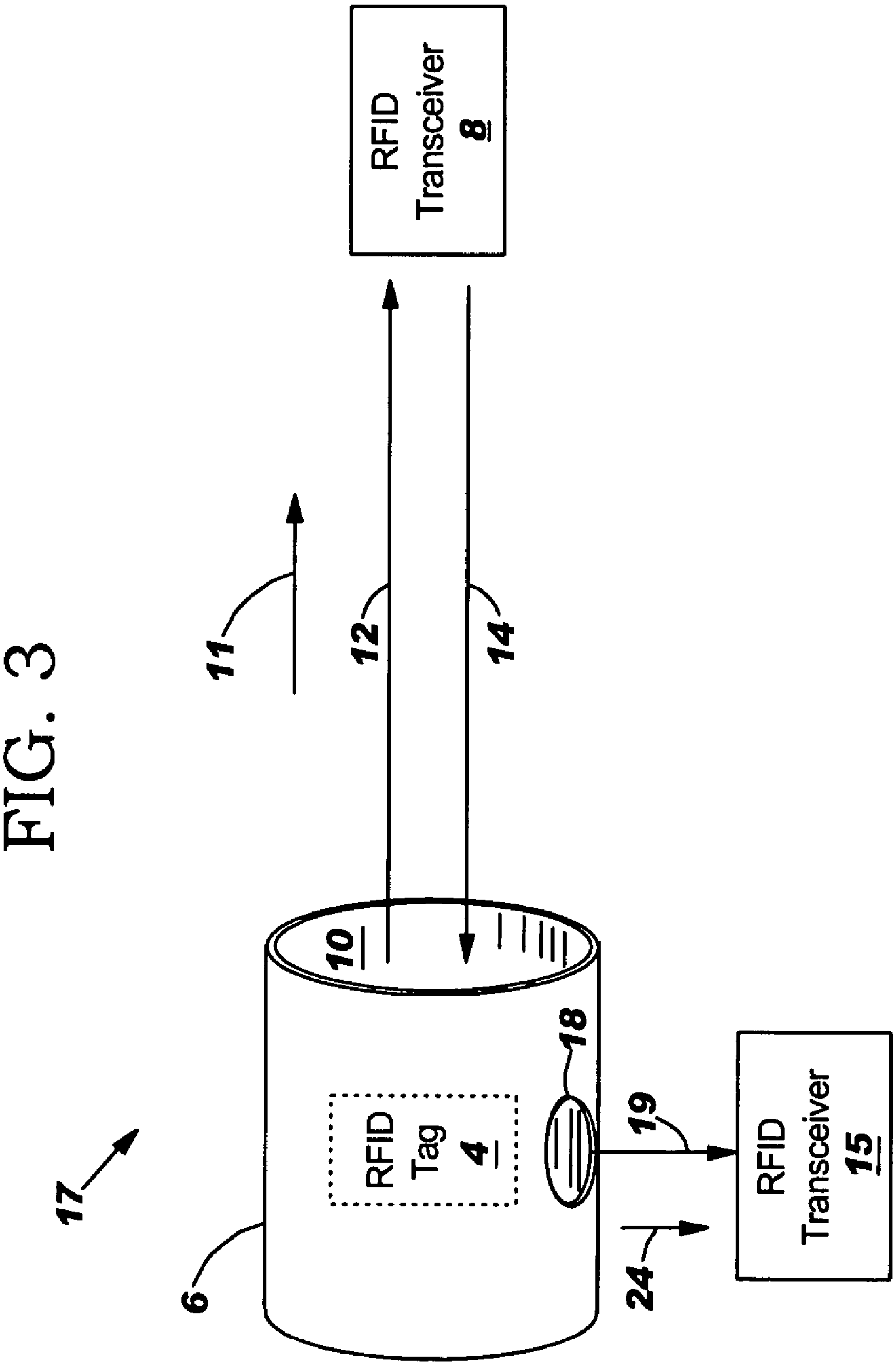
FIG. 3 illustrates a second alternative to FIG. 1, in accordance with embodiments of the present invention

FIG. 3 illustrates a second alternative to FIG. 1 showing a block diagram of a system 17 for collimating a plurality of signals between a RFID tag 4 and RFID transceivers 8 and 15, in accordance with embodiments of the present invention. The system 17 comprising the RFID tag 4 and the RFID transceivers 8 and 15 may be used to identify and/or track items by placing the RFID tag 4 in the item and using the RFID transceivers 8 and 15 to query the RFID tag 4. In response the RFID tag 4 transmits data to the RFID transceiver 8. For example, the system 17 may be used for, inter alia, product price scanning, airline baggage tracking, electronic toll collection, spacial measurements, spacial measurements with time differential, etc. In contrast to FIG. 1, the system 17 of FIG. 3 comprises two RFID transceivers 8 and 15. The enclosure structure 6 comprises an opening 10 and an opening 18. The RFID tag 4 in FIG. 3 is placed in the enclosure structure 6 comprising a radio frequency opaque material and openings 10 and 18. The enclosure structure 6 comprises a radio frequency opaque material that is opaque to a plurality of frequencies including a frequency of the signal 12, a frequency of the signal 14, and a frequency of the signal 19 so that the signals 12 and 14 are directed through the opening 10 and the signal 19 is directed through the opening 18. Therefore the enclosure structure 6 collimates the signal 12 and the signal 14 between the RFID tag 4 and the RFID transceiver 8 and the signal 19 from the RFID tag 4 to the RFID transceiver 15. Based on the configuration of FIG. 3, the RFID transceiver 8 may send out a query (i.e., signal 14) to the RFID tag 4. In response, the RFID tag 4 may send a response (i.e., signals 12 and 19) to both the and both the RFID transceiver 8 and the RFID transceiver 15. The collimation property of the enclosure structure 6 prevents the signas 12 and 19 from the RFID tag 4 from interfering with any external signals that may be in an area surrounding the enclosure structure 6 as the signal 12 is directed through the opening 10 and the signal 19 is directed through the opening 18 by the radio frequency opaque material of the enclosure structure 6. Additionally, the enclosure structure 6 blocks any external signals (e.g., a signal from another RFID transceiver) from transmitting to the RFID tag 4 except through the openings 10 and 18. The opening 10 forces the signals 12 and 14 in a direction 11 and opposite to the direction 11, respectively. The opening 18 forces the signal 19 in a direction 24. The radio frequency opaque material may comprise any radio frequency opaque material including, inter alia, metal (solid or stranded), plastic, liquid, gas, etc. The enclosure structure 6 in FIG. 3 is cylindrical in shape but may alternatively comprise any shape including, inter alia, cubical, triangular, rectangular, polygon, spherical, etc.

Figure 4:
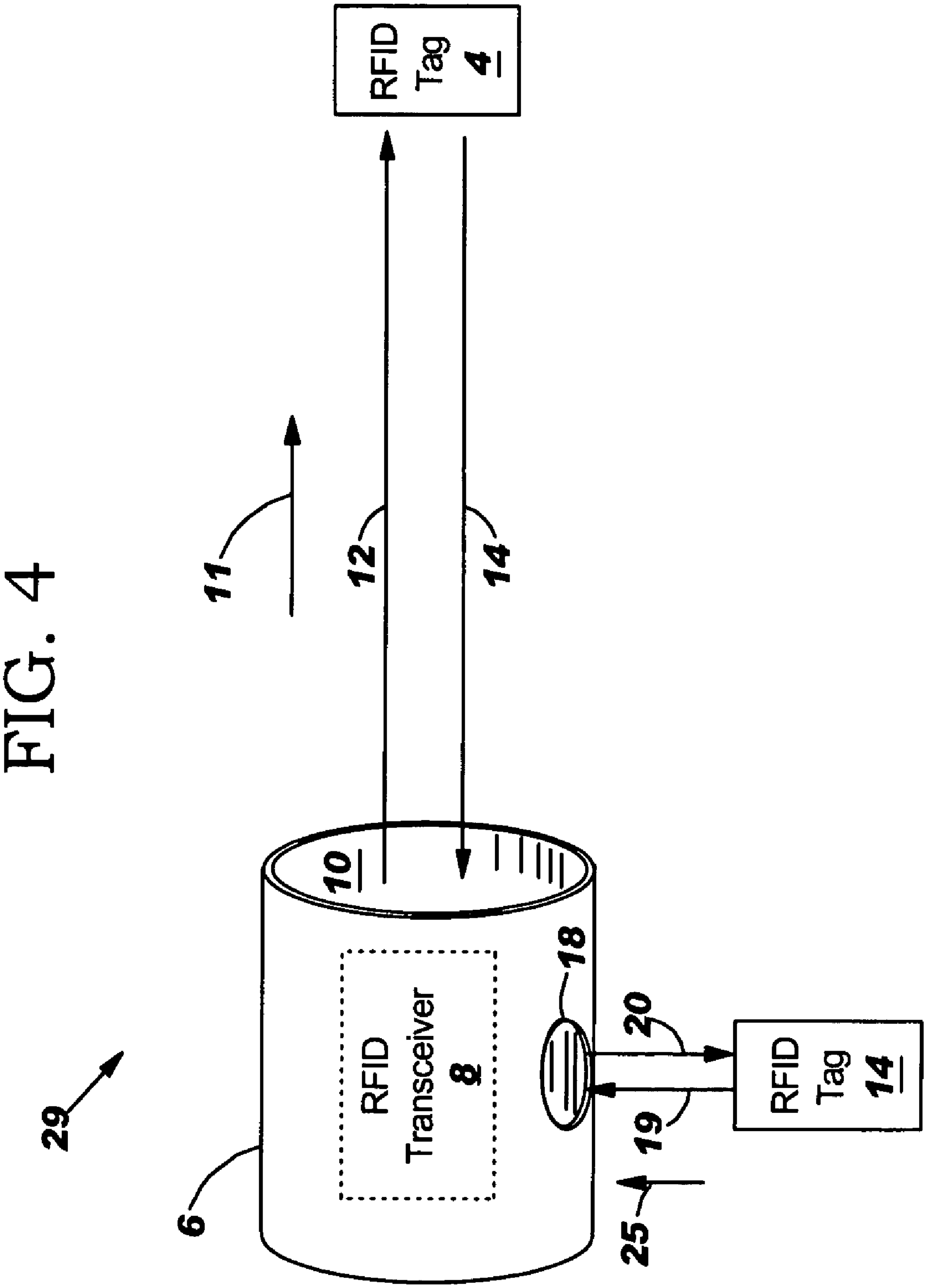
FIG. 4 illustrates an alternative to FIG. 2, in accordance with embodiments of the present invention

FIG. 4 illustrates an alternative to FIG. 2 showing a block diagram of a system 29 for collimating a signal 12 and a signal 14 between an RFID transceiver 8 and a RFID tag 4 and a signal 20 and a signal 19 between the RFID transceiver 8 and a RFID tag 14, in accordance with embodiments of the present invention. The system 29 comprising the RFID tags 4 and 14 and the RFID transceiver 8 may be used to identify and/or track items by placing the RFID tags 4 and 14 in the item and using the RFID transceiver 8 to query the RFID tags 4 and 14. For example, the system 29 may be used for, inter alia, product price scanning, airline baggage tracking, electronic toll collection, spacial measurements, spacial measurements with time differential, etc. In contrast to FIG. 2, the enclosure structure 6 in FIG. 4 comprises two openings 10 and 18. The RFID transceiver 8 in FIG. 4 is placed in the enclosure structure 6 comprising a radio frequency opaque material and openings 10 and 18. The enclosure structure 6 comprises a radio frequency opaque material that is opaque to a plurality of frequencies including a frequency of the signal 12, a frequency of the signal 14, a frequency of the signal 19, and a frequency of the signal 20 so that the signals 12 and 14 are directed through the opening 10 and signals 19 and 20 are directed through the opening 18. Therefore the enclosure structure 6 collimates the signals 12 and 14 between the RFID tag 4 and the RFID transceiver 8 and the signals 19 and 20 between the RFID tag 14 to the RFID transceiver 8. Based on the configuration of FIG. 4, the RFID transceiver 8 may send out a query (i.e., signals 14 and 20) to the RFID tags 4 and 14. In response, the RFID tags 4 and 14 may each send a response (i.e., signals 12 and 19) to the RFID transceiver 8. The collimation property of the enclosure structure 6 prevents the signals 14 and 20 from the RFID transceiver 8 from interfering with any external signals that may be in an area surrounding the enclosure structure 6 as the signal 14 is directed through the opening 10 and the signal 20 is directed through the opening 18 by the radio frequency opaque material of the enclosure structure 6. Additionally, the collimation property of the enclosure structure 6 blocks any external signals (e.g., a signal from another RFID tag) from transmitting to the RFID transceiver 8 except through the openings 10 and 18. The opening 10 forces the signals 12 and 14 in a direction 11 and opposite to the direction 11, respectively. The opening 18 forces the signals 19 and 20 in a direction 25 and opposite to the direction 25, respectively. The radio frequency opaque material may comprise any radio frequency opaque material including, inter alia, metal (solid or stranded), plastic, liquid, gas, etc. The enclosure structure 6 in FIG. 4 is cylindrical in shape but may alternatively comprise any shape including, inter alia, cubical, triangular, rectangular, polygon, spherical, etc.

Figure 5:
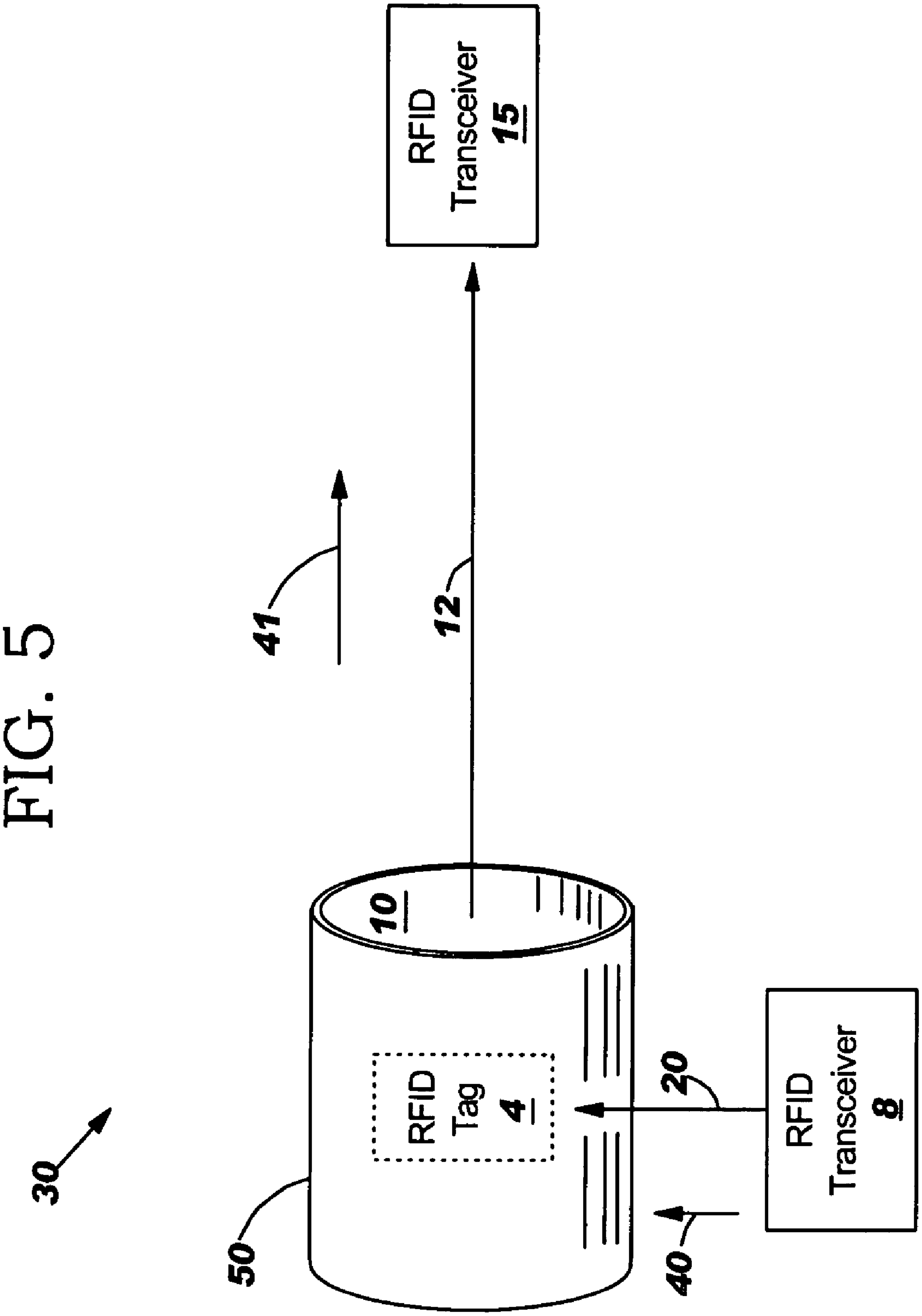
FIG. 5 illustrates an alternative to FIG. 3, in accordance with embodiments of the present invention

FIG. 5 illustrates an alternative to FIG. 3 showing a block diagram of a system 30 for collimating signals 12 and 20 between a RFID tag 4 and RFID transceivers 8 and 15, in accordance with embodiments of the present invention. The system 17 comprising the RFID tag 4 and the RFID transceivers 8 and 15 may be used to identify and/or track items by placing the RFID tag 4 in the item and using the RFID transceiver 8 to query the RFID tag 4. For example, the system 30 may be used for, inter alia, product price scanning, airline baggage tracking, electronic toll collection, spacial measurements, spacial measurements with time differential, etc. In contrast to FIG. 3, the enclosure structure 50 of FIG. 5 comprises an RF opaque material that is opaque to a frequency of the signal 12 but transparent to a frequency of the signal 20 (the signal 12 and the signal 20 each comprise a different frequency). The RFID tag 4 in FIG. 5 is placed in the enclosure structure 50 comprising a radio frequency opaque material and opening 10. The RFID transceiver 8 transmits the signal 20 in a direction 40 through the enclosure structure 50 (i.e., material of the enclosure structure 12 is transparent to the frequency of the signal 20) to the RFID tag 4. In response, the RFID tag 4 transmits a response signal 12 to the RFID transceiver 15 through the opening 10. The signal 12 may not transmit back to the RFID transceiver 8 because the material of the enclosure structure 50 is transparent to the frequency of the signal 20 but opaque to the frequency of the signal 12. Therefore the enclosure structure 50 collimates the signal 20 in a direction 40 to the RFID tag 4 and (in response) the signal 12 in a direction 41 from the RFID tag 4 to the RFID transceiver 15. Based on the configuration of FIG. 5, the RFID transceiver 8 may send out a query (i.e., signal 20) to the RFID tag 4. In response, the RFID tag 4 sends a response (i.e., signal 12) to the RFID transceiver 15. The collimation property of the enclosure structure 50 prevents the signal 12 from the RFID tag 4 from interfering with any external signals that may be in an area surrounding the enclosure structure 12 as the signal 12 is directed through the opening 10 by the radio frequency opaque material (i.e., opaque to the frequency of the signal 12) of the enclosure structure 50. Additionally, the enclosure structure 50 blocks any external signals (e.g., a signal from another RFID transceiver) from transmitting to the RFID tag 4 except through the opening 10 or if an external signal comprises a frequency of which the material of the enclosure structure 50 is opaque. The radio frequency opaque material may comprise any radio frequency opaque material including, inter alia, metal (solid or stranded), plastic, liquid, gas, etc. The enclosure structure 50 in FIG. 5 is cylindrical in shape but may alternatively comprise any shape including, inter alia, cubical, triangular, rectangular, polygon, spherical, etc.

Figure 6:
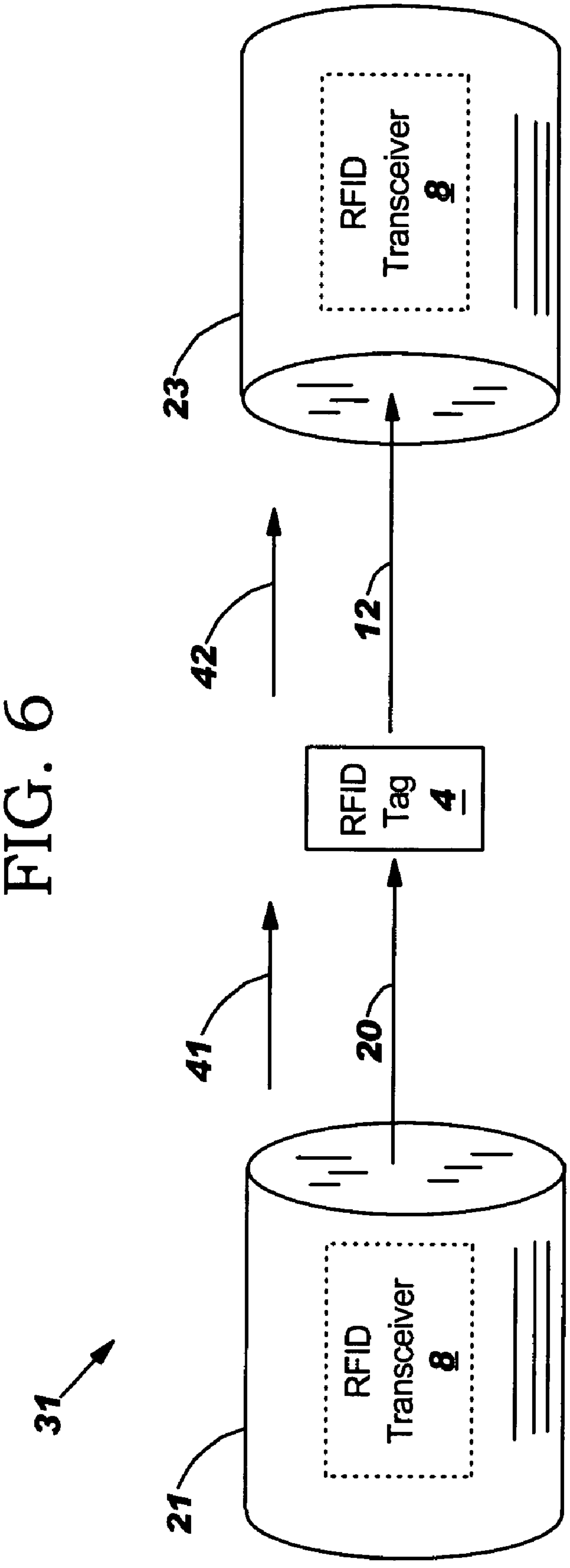
FIG. 6 illustrates an alternative to FIG. 5, in accordance with embodiments of the present invention.

FIG. 6 illustrates an alternative to FIG. 5 showing a block diagram of a system 31 for collimating signals 12 and 20 between a RFID tag 4 and RFID transceivers 8 and 15, in accordance with embodiments of the present invention. The system 31 comprising the RFID tag 4 and the RFID transceivers 8 and 15 may be used to identify track items by placing the RFID tag 4 in the item and using the RFID transceiver 8 to query the RFID tag 4. For example, the system 31 may be used for, inter alia, product price scanning, airline baggage tracking, electronic toll collection, spacial measurements, spacial measurements with time differential, etc. In contrast to FIG. 5, the RFID transceiver 8 is placed in a first enclosure structure 21 and the RFID transceiver 15 is placed in a second enclosure structure 23. The enclosure structure 21 and the enclosure structure 23 do not comprise any openings. The enclosure structure 21 comprises an RF opaque material that is opaque to a frequency of the signal 12 but transparent to a frequency of the signal 20 (the signal 12 and the signal 20 each comprise a different frequency). The enclosure structure 23 comprises an RF opaque material that is opaque to a frequency of the signal 20 but transparent to a frequency of the signal 12. The RFID transceiver 8 transmits the signal 20 in a direction 41 through the enclosure structure 21 (i.e., material of the enclosure structure 21 is transparent to the frequency of the signal 20) to the RFID tag 4. In response, the RFID tag 4 transmits a response signal 12 in the direction 41 to the RFID transceiver 15 through the enclosure structure 23 (i.e., material of the enclosure structure 23 is transparent to the frequency of the signal 12). The signal 12 may not transmit back to the RFID transceiver 8 because the material of the enclosure structure 21 opaque to the frequency of the signal 12. Therefore the enclosure structure 21 collimates the signal 20 in the direction 41 to the RFID tag 4 and (in response) the signal 12 in the direction 41 from the RFID tag 4 to the RFID transceiver 15. Based on the configuration of FIG. 6, the RFID transceiver 8 may send out a query (i.e., signal 20) to the RFID tag 4. In response, the RFID tag 4 sends a response (i.e., signal 12) to the RFID transceiver 15. The radio frequency opaque material of the enclosure structure 21 and the enclosure structure 23 may comprise any radio frequency opaque material including, inter alia, metal (solid or stranded), plastic, liquid, gas, etc. The enclosure structures 21 and 23 in FIG. 6 are each cylindrical in shape but may alternatively comprise any shape including, inter alia, cubical, triangular, rectangular, polygon, spherical, etc.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An electrical structure comprising:

a RFID tag; and an enclosure structure comprising a radio frequency opaque material, wherein the RFID tag is located within the enclosure structure, wherein the enclosure structure is adapted to collimate, a first radio frequency signal from a first RFID transceiver to the RFID tag, wherein the enclosure structure is adapted to collimate, a second radio frequency signal from the RFID tag to a second RFID transceiver in response to the first radio frequency signal, wherein the first RFID transceiver is not in a same location as the second RFID transceiver, wherein the first radio frequency signal comprises a first frequency, wherein the second radio frequency signal comprises a second frequency, wherein the first frequency is not a same frequency as the second frequency, wherein the radio frequency opaque material is transparent to the first frequency and opaque to the second frequency, wherein the radio frequency opaque material is adapted to collimate said first radio frequency signal from the first RFID transceiver to the RFID tag, wherein the enclosure structure comprises at least a first opening, and wherein the at least first opening is adapted to collimate said second radio frequency signal from the RFID tag to the second RFID transceiver in response to said first radio frequency signal.

2. The electrical structure of claim 1, wherein the enclosure structure is cylindrical in shape.

3. The electrical structure of claim 1, wherein the radio frequency opaque material is selected from the group consisting of metal, plastic, liquid, and gas.

4. The electrical structure of claim 1, wherein the first radio frequency signal comprises a query signal, and wherein the second radio frequency signal comprises a response signal.

5. The electrical structure of claim 1, wherein the enclosure structure is adapted to block any external radio frequency signals from any additional RFID transceivers from transmitting to the RFID tag.

6. A system comprising:

a RFID tag;

a first RFID transceiver within a first enclosure structure, wherein the first enclosure structure comprises a first radio frequency opaque material; and a second RFID transceiver within a second enclosure structure, wherein the second enclosure structure comprises a second radio frequency opaque material, wherein the first enclosure structure is adapted to collimate a first radio frequency signal comprising a first frequency from the first RFID transceiver to the RFID tag, and wherein the second enclosure structure is adapted to collimate a second radio frequency signal comprising a second frequency from the RFID tag to the second RFID transceiver in response to the first radio frequency signal, wherein the first frequency is not a same frequency as the second frequency, wherein the first radio frequency opaque material is transparent to the first frequency and opaque to the second frequency, wherein the second radio frequency opaque material is transparent to the second frequency, wherein the first radio frequency opaque material is adapted to collimate said first radio frequency signal from the first RFID transceiver to the RFID tag, and wherein the second radio frequency opaque material is adapted to collimate said second radio frequency signal from the first RFID tag to the second RFID transceiver.

7. The system of claim 6, wherein the first radio frequency signal comprises a query signal, and wherein the second radio frequency signal comprises a response signal.

8. The system of claim 6, wherein the enclosure structure is adapted to block any external radio frequency signals from any additional RFID tags from transmitting to the first RFID transceiver and the second RFID transceiver.

9. A method comprising:

providing a first RFID tag, a first RFID transceiver, a second RFID transceiver, and an enclosure structure, wherein the enclosure structure comprises a radio frequency opaque material;

placing the first RFID tag in the enclosure structure;

first collimating by the enclosure structure, a first radio frequency signal from the first RFID transceiver to the first RFID tag; and second collimating by the enclosure structure, a second radio frequency signal from the first RFID tag to the second RFID transceiver in response to the first radio frequency signal, wherein the first RFID transceiver is not in a same location as the second RFID transceiver, wherein the first radio frequency signal comprises a first frequency, wherein the second radio frequency signal comprises a second frequency, wherein the first frequency is not a same frequency as the second frequency, wherein the radio frequency opaque material is transparent to the first frequency and opaque to the second frequency, wherein the radio frequency opaque material performs said first collimating said first radio frequency signal from the first RFID transceiver to the RFID tag, wherein the enclosure structure comprises a first opening, and wherein the first opening performs said second collimating said second radio frequency signal from the RFID tag to the second RFID transceiver in response to said first radio frequency signal.

10. The method of claim 9, wherein the first radio frequency signal comprises a query signal, and wherein the second radio frequency signal comprises a response signal.

11. The method of claim 9, further comprising:

blocking, by said enclosure structure any external radio frequency signals from any additional RFID tags from transmitting to the first RFID transceiver and the second RFID transceiver.

12. A method comprising:

providing an a RFID tag, a first RFID transceiver within a first enclosure structure, and a second RFID transceiver within a second enclosure structure, wherein the first enclosure structure comprises a first radio frequency opaque material, and wherein the second enclosure structure comprises a second radio frequency opaque material;

first collimating by said first radio frequency opaque material of first enclosure structure, a first radio frequency signal comprising a first frequency from the first RFID transceiver to the RFID tag; and second collimating by said second radio frequency opaque material of said second enclosure structure, a second radio frequency signal comprising a second frequency from the RFID tag to the second RFID transceiver in response to the first radio frequency signal, wherein the first frequency is not a same frequency as the second frequency, wherein the first radio frequency opaque material is transparent to the first frequency and opaque to the second frequency, and wherein the second radio frequency opaque material is transparent to the second frequency.

* * * * *